United States Patent Office 3,298,849
Patented Jan. 17, 1967

3,298,849
AMINE MODIFIED CLAY AND METHOD
Eugene J. Dohman, Richard G. Shaler, and William A. Rinehimer, Las Vegas, Nev., assignors, by mesne assignments, to American Tansul Company, Las Vegas, Nev., a corporation of California
No Drawing. Filed July 5, 1963, Ser. No. 293,150
18 Claims. (Cl. 106—288)

This invention relates to modified clays of the swelling, gelling type. More particularly, it relates to amine modified clays of the above type that are additionally combined with a humectant to thereby enhance the utility of the clays in a number of ways.

In accordance with the present invention, there is provided a clay composition having improved hydration and other properties comprising a modified swelling, gelling, cation exchangeable clay containing an alkanolamine acid salt, and a humectant having a boiling point above water. Clays of the above type have heretofore been modified by incorporation therein of an alkanolamine acid salt. Reference is made to copending patent application, Serial No. 42,058, filed July 11, 1960, wherein a full discussion of the alkanolamine modification of the above clays is described.

As examples of the advantages gained by modifying the clays with alkanolamine acid salts, it is to be noted that the thixotropic properties of the modified clays in an aqueous dispersion are markedly increased. Further, the alkanolamine acid salt clays are essentially non-ionic and are not appreciably adversely affected by the addition of electrolytes to their aqueous dispersions and therefore maintain the desired viscosity or yield value of the dispersion. Also, the modified compositions attain their terminal rheological properties in a shorter time than unmodified clays.

The combination of a humectant with swelling, gelling, cation exchangeable clays has also been previously described. Reference is made to copending patent application, Serial No. 815,480, filed May 25, 1959. This application describes the combination of various humectants with the appropriate clays during their beneficiation or refining, during which time calcite and other impurities are separated therefrom. The application also describes the advantages of making the combination of the humectant with the clay. In particular, the application points out that by reason of the combination, the clays do not calcine during drying and rehydrate more rapidly to form a more viscous and desirable gell as compared with untreated clays.

It has now been discovered that by treating the appropriate clays by combining them simultaneously with a humectant and with an alkanolamine acid salt, further and unexpected advantages are gained than where the two modifications are separately employed. One of the most noticeable improvements lies in the area of rehydration of the finished clay product where the clay has been dried as part of the preparation process and later utilized in an aqueous medium. It has been found that the clays of the present invention rehydrate more quickly to provide a more desirable consistency than either of the two types of modified clays described in the two cited copending applications. In other words, it has been found that the combination of the two modifications results in a synergistic effect, at least in the area of rehydration. That is, the hydration and dispersability of the clay is markedly improved in either hot or cold water.

Other advantages flow from the present product and method of preparation in related areas. Thus, the present compositions exhibit a reproducible viscosity not found in other types of similar materials. When employed in the various areas of its utility, such as in the formulation of aqueous base paints, lower shear mixing requirements are necessary. The present product has increased stability with respect to changes in the electrolyte content of the media in which they are employed. While they are primarily designed for water dispersions, they exhibit a high tolerance for organic solvents. They also show increased thixotropy at relatively lower concentrations.

The clays which may be employed in the present process and product are of the same types as those described in the above cited copending applications. Thus, any gelling, swelling cation exchangeable clay is suitable for present purposes. Preferred materials include the montmorillonite clays such as biedellite, nontronite, saponite, and the like. Of most interest is the montmorillonite clay known as hectorite, a typical analysis of properties and description of which may be found in United States Patent No. 2,416,007, patented February 18, 1947.

As before, the selected clay is modified by combination with an acid salt of an alkanolamine. A suitable group of alkanolamines that can be used may be illustrated by the structural formula

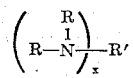

wherein $x$ is a positive integer from 1–2, and when $x$ equals 1, each R and R' individually is selected from the group consisting of the hydrogen atom, the alkyl radical, and the mono and polyhydroxy alkyl radicals, and when $x$ equals two, each R has the above definition and R' is an alkylene radical. Preferred compounds include the monoamino compounds wherein $x$ equals 1 and which contain three hydroxy groups. It is preferred that each alkyl or alkyl radical of the above described generic structure contain no more than six carbon atoms so as not to unduly impair the water solubility of the acid salt derived therefrom. Thus, preferred materials of the present invention are monoamino polyhydroxy alkanolamines including such as tris hydroxymethyl aminomethane, triethanolamine, triisopropanolamine, 2-amino 2-methyl-1, 3-propanediol, and the like. It is also noted however that monoamino monohydroxy compounds such as monoethanolamine are included within the scope of these materials.

The acid salt of the selected alkanolamine is formed by contacting the alkanolamine with acid in an aqueous solution. Relatively strong acids are preferred for this purpose. The acid selected may be an organic acid such as the relative stronger carboxylic acids exemplified by formic acid, acetic acid, oxalic acid, and the like. Preferably, where an organic acid is employed, it is one of the unsaturated acids such as maleic. Most preferably however, the acid selected is a strong inorganic acid. Acids of this group may include hydrochloric acid, nitric acid, perchloric acid, and the like. Sulfuric acid is a preferred material for present purposes.

The acid salt is formed by adding a sufficient amount of acid to convert the alkanolamine to salt form so that when combined with the clay, salt addition and the desired properties result. Depending on the end use of the product, varying proportions of acid and amine may be chosen. Frequently, the acid will be used in precisely equivalent proportions to the alkanolamine so that no excess of either component remains. This is not to be construed as a caution to avoid an excess of either component where the utility of the product can tolerate the same. In one formulation, it has been found that the use of a quantity of acid equivalent to ½ of the quantity of acid required on a chemical equivalency basis with respect to the alkanolamine has been found to produce a most desirable end product. In this regard it has been found that the use of such a proportion of acid to alkanolamine provides a product that may be dried at relatively high temperatures without burning or in any other way adversely affecting the properties of the end product. If drying at lower temperatures is contemplated the use of such a proportion of acid may be less advantageous.

It has been found that selectively controlling the quantity of acid on an equivalent basis with respect to the alkanolamine permits the obtaining of various consistencies and properties in the end product. For example, by using an equivalent quantity of acid with respect to the alkanolamine, the end product exhibits thixotropy in the manner previously associated with alkanolamine acid salt modified materials. Where ½ the equivalent amount of acid with respect to the alkanolamine is utilized, the end product is rheopectic. Thus, it is possible to "tailor" the product and create the properties desired.

The alkanolamine acid salt is combined with the selected clay by contacting the two materials in an aqueous medium. Modification of the clay appears to proceed by way of a salt addition mechanism, although the chemical structure of the end product is not precisely known. The amount of acid salt used with respect to the clay will generally be that which approaches the saturation point of the clay from an ion exchange capacity standpoint. For example, on an average, hectorite exhibits an ion exchange capacity of 100 milliequivalents per 100 grams of purified clay. Accordingly, to saturate the clay 100 milliequivalents of alkanolamine acid salt per 100 grams of clay are required. Under certain conditions, however more or less may be found desirable. Generally, the amount of acid salt used with respect to the clay will be at least about 25% of the ion exchange capacity of the clay. If quantities smaller than this are used, the modifying effect of the amine acid salt may tend to become ineffectual.

The humectant employed in the present process and product may be any of the various water soluble materials utilized for such a purpose which have a boiling point above that of water. Where the product is dried, it may be desirable to select a humectant having a boiling point above the drying temperature so as to minimize the loss of the humectant during the processing.

The humectant is preferably selected from the group consisting of polysaccharides, either natural, synthetic, or modified in any of the various ways known to those skilled in the art, and organic polyols, especially aliphatic hydrocarbon polyols. Examples of organic polyols include glycerol, propylene glycol, ethylene glycol, and polyethylene glycol. As examples of polysaccharides suitable materials include hexahydricalcohol, dextrin, dextran, and most preferably sorbitol.

The humectant is combined with the other appropriate materials so as to constitute at least about 1% by weight with respect to the purified clay in the finished product. Theoretically, there is no upper limit to the amount of humectant which may be utilized in the product. The upper limit will be limited by practical considerations such as economics and the properties desired. Thus, where the end uses dictate, the humectant may constitute up to several thousand percent by weight with respect to the purified clay in the end product.

The amount of humectant remaining in the end product is a function of the boiling point of the humectant, the conditions of drying of the end product, and the amount of humectant added with the starting materials. For example, where the humectant constitutes 10% by weight with respect to the clay but has a relatively low boiling point, a portion of this may be lost during the drying, especially where the drying temperature is much above the boiling point of water. As a result, the finished dry product may contain only 4 or 5% humectant with respect to the clay. Where the humectant has a relatively high boiling point, substantially all of the humectant may be found in the end product. To further illustrate this point, propylene glycol having a boiling point of 188° C., when added to appropriate clay-alkanolamine salt materials and dried, has been found to exist in the end dried product in an amount of only about 15% of the initially added material. On the other hand, diethylene glycol having a boiling point of 245° C. and under the same conditions, has been found to be present in the end product in an amount of about 63% of the starting amount.

Sorbitol, the preferred humectant for present purposes, has been found to be present in many of the end products to which it has been added in amounts up to about 80 to 90% or more of the starting humectant material. Utilizing sorbitol as a humectant, it is preferably combined with the other starting materials in an amount of about 5% by weight with respect to the starting clay, and, accordingly, will be generally present in the end product in an amount of about 3 to 5% by weight with respect to the clay in the final product.

Considerable variation is possible in the preparation and practice of the present method. On the one hand all of the components of the composition may be added substantially at the same time to an aqueous medium and suitably blended to obtain the necessary reaction. When a dry product is desired, it is simply a matter of moisture removal by heat, and/or vacuum or like techniques. The only step which need precede the actual preparation of the product is the purification of the clay component by way of calcite removal. This is accomplished by well known techniques including slurrying of the clay in an aqueous solution and separation of the calcite by centrifuging for example.

On the other hand, the materials can be combined stepwise and, at least in the case of the alkanolamine salt, separately prepared before being added to the other materials. Thus, in the preferred method of the present invention, the crude clay is slurried and calcite is separated from the slurry. The humectant is then added to the calcite free slurry. Separately, the selected alkanolamine and acid are combined to form the alkanolamine acid salt. The pre-reacted acid salt solution is then added to the calcite free clay slurry containing the humectant. After suitable blending, moisture is removed from the slurry as desired. By following the above preferred order of reaction, a more desirable end product is obtained.

As an example of the present invention, the following preparation is described:

Hectorite is purified in conventional fashion in an aqueous slurry and calcite and other impurities removed in a centrifuge. To an aqueous slurry containing 100 parts by weight of purified hectorite, five parts by weight of sorbitol is added. Separately, in an aqueous solution 11 parts by weight of tris hydroxymethyl aminomethane and 2.3 parts by weight of sulfuric acid are blended to react and form an acid salt. The alkanolamine acid salt is then mixed with the hectorite-sorbitol combination and allowed to react. The product is dried on a drum dryer whose surface temperature is about 260° F. The final flaked dried product exhibits the advantages previously discussed.

To illustrate the advantageous and synergistic effect of the combined ingredients of the foregoing materials, the following test was performed. A quantity of the above prepared material was compared with an equal quantity of a material prepared in the above manner except that the sorbitol was omitted. Another product was prepared in the same way except that the alkanolamine acid salt was omitted and a fourth material comprising purified, unmodified hectorite were also taken in equal quantities. All materials were placed in separate aqueous solutions and mixed for two minutes at high shear. The material prepared as described above in accordance with the present invention completely hydrated during this time and with a much greater viscosity than any of the other materials.

This advantageous property of the present material is of practical importance from a commercial standpoint. The rapid hydration time and achievement of desired viscosity in a short period means that the equipment of the manufacturer who is using the present materials is free to process more material in a shorter period of time, leading to reduced production costs. Where the present material is used in the formulation of paint, in addition to this practical effect in reducing production costs, it has also been observed that the development of the color in the paint is noticeably enhanced.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A clay composition having improved hydration properties comprising a modified swelling, gelling, cation exchangeable clay containing an alkanolamine acid salt in an amount sufficient to substantially increase the rate of initial viscosity development when the dried composition is dispersed in an aqueous medium, and a humectant having a boiling point above water in an amount of about 1–20% by weight of the clay, said alkanolamine acid salt and humectant being present in proportions sufficient to synergistically increase the rehydration rate of the dry clay composition when compared with that exhibited by clay modified with either the alkanolamine acid salt or the humectant alone.

2. A clay composition having improved hydration properties comprising a modified swelling, gelling, cation exchangeable clay containing an alkanolamine acid salt in an amount equivalent to at least about 25% of the ion exchange capacity of said clay and in an amount sufficient to substantially increase the rate of initial viscosity development when the dried composition is dispersed in an aqueous medium, and a humectant comprising an organic polyol having a boiling point above water in an amount of at least about 1% by weight with respect to the unmodified clay and up to about 20% by weight thereof, said alkanolamine acid salt and humectant being present in proportions sufficient to synergistically increase the rehydration rate of the dry clay composition when compared with that exhibited by clay modified with either the alkanolamine acid salt or the humectant alone.

3. A clay composition in accordance with claim 2 wherein said alkanolamine acid salt contains a quantity of acid that is about one-half the chemical equivalent with respect to the quantity of said alkanolamine.

4. A clay composition in accordance with claim 2 wherein said alkanolamine acid salt contains a quantity of acid that is about the chemical equivalent with respect to the quantity of said alkanolamine.

5. A clay composition in accordance with claim 2 wherein said alkanolamine acid salt is present in an amount approximately chemically equivalent to the ion exchange capacity of said clay.

6. A clay composition having improved hydration properties comprising a modified montmorillonite clay containing an alkanolamine salt of a strong inorganic acid in an amount equivalent to at least about 25% of the ion exchange capacity of said clay and in an amount sufficient to substantially increase the rate of initial viscosity development when the dried composition is dispersed in an aqueous medium, and a humectant having a boiling point above water selected from the group consisting of polysaccharides and aliphatic hydrocarbon polyols in an amount of at least about 1% by weight with respect to the unmodified clay and up to about 20% by weight thereof, said alkanolamine acid salt and humectant being present in proportions sufficient to synergistically increase the rehydration rate of the dry clay composition when compared with that exhibited by clay modified with either the alkanolamine acid salt or the humectant alone.

7. A clay composition having improved hydration properties comprising a modified montmorillonite clay containing a polyhydroxymonoamino alkanolamine salt of a strong inorganic acid in an amount approximately equivalent to the ion exchange capacity of said clay, and a humectant having a boiling point above water selected from the group consisting of polysaccharides and aliphatic hydrocarbon polyols in an amount of at least about 1% by weight with respect to the unmodified clay and up to about 20% by weight thereof, said alkanolamine acid salt and humectant being present in proportions sufficient to synergistically increase the rehydration rate of the dry clay composition when compared with that exhibited by clay modified with either the alkanolamine acid salt or the humectant alone.

8. A clay composition having improved hydration properties comprising modified hectorite containing a polyhydroxymonoamino alkanolamine salt of a strong inorganic acid in an amount approximately equivalent to the ion exchange capacity of said hectorite, and a humectant having a boiling point above water selected from the group consisting of polysaccharides and aliphatic hydrocarbon polyols, said alkanolamine acid salt and humectant being present in proportions sufficient to synergistically increase the rehydration rate of the dry clay composition when compared with that exhibited by clay modified with either the alkanolamine acid salt or the humectant alone.

9. A clay composition in accordance with claim 8 wherein said strong inorganic acid is sulfuric acid.

10. A clay composition having improved hydration properties comprising modified hectorite containing a sulfuric acid salt of tris hydroxymethyl aminomethane, said salt being present in an amount approximately equivalent to the exchange capacity of said hectorite, said salt containing a quantity of sulfuric acid that is approximately one-half the chemical equivalent with respect to the quantity of said aminomethane and sorbitol in an amount of about 3–5% by weight of said unmodified hectorite.

11. A method for the preparation of an improved clay composition comprising forming an aqueous slurry of a crude swelling, gelling, cation exchangeable clay, separating calcite from said clay slurry, adding a humectant having a boiling point above water to said calcite-free clay slurry, forming an acid salt of an alkanolamine, adding said alkanolamine acid salt to said calcite-free slurry and in an amount sufficient to substantially increase the rate of initial viscosity development when the moisture free product is rehydrated, and removing the moisture from said slurry and in an amount sufficient to prevent calcining of the clay during removal of the moisture, said alkanolamine acid salt and humectant being added in proportions sufficient to synergistically increase the rehydration rate of the dry clay composition when compared with that exhibited by clay modified with either the alkanolamine acid salt or the humectant alone.

12. A method for the preparation of an improved clay composition comprising forming an aqueous slurry of a crude montmorillonite clay, separating calcite from said clay slurry, adding an organic polyol humectant having a boiling point above water to said calcite free clay slurry, forming an acid salt of an alkanolamine with a strong inorganic acid, adding said alkanolamine acid salt to said calcite free slurry in an amount equivalent to at least about 25% of the ion exchange capacity of said clay, and in an amount sufficient to substantially increase the rate of initial viscosity development when the dried product is rehydrated, and drying said slurry, said humectant being added in a sufficient amount so as to constitute at least about 1% with respect to the clay in the dried product and being sufficient to prevent calcining during the drying thereof, said alkanolamine acid salt and humectant being added in proportions sufficient to synergistically increase the rehydration rate of the dry clay composition when compared with that exhibited by clay modified with either the alkanolamine acid salt or the humectant alone.

13. A method in accordance with claim 12 wherein said alkanolamine acid salt is formed with about one-half the chemically equivalent quantity of acid with respect to the quantity of said alkanolamine.

14. A method in accordance with claim 12 wherein said slurry is dried at a temperature above the boiling point of water.

15. A method in accordance with claim 12 wherein said strong inorganic acid is sulfuric acid and said slurry is dried at about 260° F.

16. A method for the preparation of an improved clay composition comprising forming an aqueous slurry of a crude montmorillonite clay, separating calcite from said clay slurry, adding a humectant having a boiling point above water to said calcite free clay slurry selected from the group consisting of polysaccharides and aliphatic hydrocarbon polyols, forming a strong inorganic acid salt of a polyhydroxy monoamino alkanolamine, adding said alkanolamine acid salt to said calcite free slurry in an amount approximately equal to the ion exchange capacity of said clay, and drying said slurry, said humectant being added to said slurry in a quantity sufficient to constitute at least amount 1% with respect to the clay in said dried slurry product and being sufficient to prevent calcining during the drying thereof, said alkanolamine acid salt and humectant being added in proportions sufficient to synergistically increase the rehydration rate of the dry clay composition when compared with that exhibited by clay modified with either the alkanolamine acid salt or the humectant alone.

17. A method in accordance with claim 16 wherein said montmorillonite clay is hectorite.

18. A method for the preparation of an improved clay composition comprising forming an aqueous slurry of hectorite, separating calcite from said hectorite slurry, adding sorbitol to said calcite free slurry in an amount of about 5% by weight with respect to said calcite free hectorite, forming a sulfuric acid salt of tris hydroxymethyl aminomethane wherein the sulfuric acid is combined in an amount approximately one-half the chemically equivalent amount of said tris hydroxymethyl aminomethane, adding said tris hydroxymethyl aminomethane acid salt to said calcite free hectorite slurry in an amount approximately equal to the ion exchange capacity of said hectorite, and drying said slurry.

References Cited by the Examiner
UNITED STATES PATENTS

| 2,531,396 | 11/1950 | Carter et al. | 106—72 |
| 2,692,869 | 10/1954 | Pechukas | 106—308 |
| 3,076,719 | 2/1963 | Whately | 106—308 |
| 3,189,557 | 6/1965 | Shaler | 252—428 |

FOREIGN PATENTS

| 589,819 | 12/1959 | Canada. |
| 590,894 | 1/1960 | Canada. |

TOBIAS E. LEVOW, *Primary Examiner.*

J. E. POER, S. E. MOTT, *Assistant Examiners.*